G. J. BUNDY.
Potato-Planter.
No. 17,827.
Patented July 21, 1857.
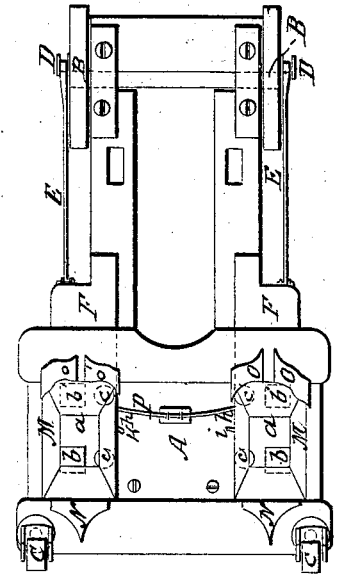
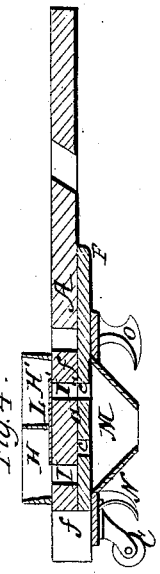
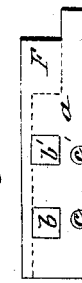
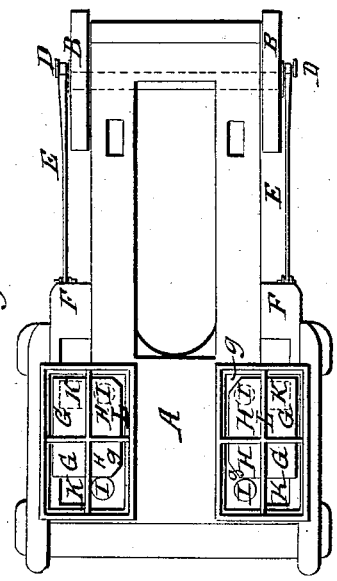
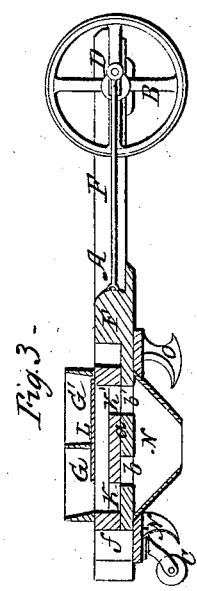
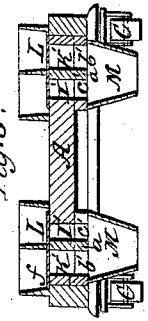

UNITED STATES PATENT OFFICE.

GALUSHA J. BUNDY, OF LYNDON, VERMONT.

IMPROVEMENT IN MACHINES FOR PLANTING POTATOES.

Specification forming part of Letters Patent No. 17,827, dated July 21, 1857.

*To all whom it may concern:*

Be it known that I, GALUSHA J. BUNDY, of Lyndon, in the county of Caledonia and State of Vermont, have invented an improved machine for planting at one and the same time potatoes or seed and a fertilizer or other matter; and I do hereby declare that the same is fully described and represented in the following specification and the accompanying drawings, of which—

Figure 1 exhibits a top view of said machine; Fig. 2, an under side view of it; Fig. 3, a vertical and longitudinal section taken through the fertilizer-hoppers; Fig. 4, a vertical and longitudinal section taken through the seed-hoppers. Fig. 5 is a vertical and transverse section taken through the seed and fertilizer hoppers.

In these drawings, A denotes a carriage or frame supported by wheels, as seen at B B and C C, the rear wheels, B B, being provided with wide peripheries and arranged respectively in the lines of the two furrows to be made and planted by the machine.

From a wrist or crank, D, extending from the outer side of each of the wheels B B, a connecting-rod, E, extends to a slider, F, arranged so as to play horizontally and rectilinearly within the carriage. A top view of the slider is shown in Fig. 6, a bottom or under side view being exhibited in Fig. 7. Each of these sliders operates in conjunction with a set of two fertilizer-hoppers, G G', and two seed-hoppers, H H', arranged on top of the frame A, as shown in the drawings. The lower part of each slider F consists of a horizontal plate or gate, $a$, which is perforated with two square and two round passages, as shown at $b\ b'$ and $c\ c'$, (see Figs. 4, 5, 6, and 7,) such part $a$ being made to extend directly underneath the seed and fertilizer chambers I I' and K K', respectively leading out of the seed and fertilizer hoppers, as shown in Figs. 1, 4, and 5.

I would observe that the seed-chambers I I' are formed entirely within the frame A, while the fertilizer-chambers K K' are formed by the said frame and the slider, portions $ff$ of the frame being extended into the slider, formed as shown in Figs. 4 and 5.

Each slider carries a horizontal gate, L, which projects from it and into the four hoppers, with which it operates, as seen in Fig. 1. The inner corners of this gate are beveled and made sharp, so as to form knives $g\ g$. The whole of the gate may be constructed of plate iron or steel, and it should be arranged on the slider in such manner as to alternately cover and uncover each of its fertilizer-chambers, as well as each of its seed-chambers, during each revolution of the wheel B, which is in rear of it. The plate $a$ of the slider may be termed the "lower movable gate," its square fertilizer-passages $b\ b'$ being arranged so as to be underneath the upper gate, and to have their outer edges arranged with respect to the outer edges of said gate as shown in Fig. 3. The seed-dropping holes $c\ c'$ are arranged with respect to their seed-chambers I I' as shown in Fig. 5.

Extending beneath each lower gate, and so as to be capable of receiving seeds and fertilizing matters as they are simultaneously discharged through apertures of the lower gate, is a truncated or frusto-pyramidal spout, M, in front of which there is arranged a furrow-opener, N, while in rear of said spout there are disposed two furrow-coverers, O O', as seen in Figs. 2 and 4.

A spring, P, fastened at its middle to the under side of the frame A, is arranged as shown in Fig. 2, and so as to extend nearly from one to the other of the gates $a\ a$. Each end of this spring operates in connection with a small tripping projection or stud, $h$, and two stops, $i\ k$, projecting from the inner edge of the gate $a$ and arranged as shown in Fig. 2.

Suitable thills or devices for attaching one or more draft-animals to the machine may be applied to its front end. Said machine may also have proper guide-handles, like those of a plow, affixed on its rear part.

The peculiar arrangement of the passages $b\ b'$ of the lower movable gate with respect to the upper gate, L, is a matter of considerable importance, as by means of such it will be seen that the discharging-passage of the fertilizer-holes K K' is decreased in size in proportion as its induction-passage is increased. This prevents too great a discharge of the fertilizing material, or causes only about one-half the quantity to be discharged from the fertilizer-hoppers that would be were there no lower gate beneath them.

The peculiar arrangement of the knives, the gates, and the seed and fertilizer holes is advantageous in planting seeds and fertilizing materials, particularly when potatoes are planted, as the knives, in passing across the upper part of their seed-holes, shear off the potatoes that may project out of them, and thereby cause equal quantities to be discharged at every dropping of the seed.

When the machine (constructed as shown in the drawings) is in use it is calculated to open and plant two furrows, also to cover and roll down the same, the latter part of the operation being effected by the hind wheels, B B. During each forward or backward motion of the slider the adjacent end of the spring P is met by the stud $h$ of such slider, which, moving against the spring, bends it until the spring slips from it and brings up smartly against one of the stops $i\,k$. Thus a jar or concussion is imparted to the slider, whereby the contents of the seed-holes are more readily discharged.

Having thus described my improved machine, what I claim therein is—

The arrangement of the two movable gates $a$ and L with the slider, the seed and fertilizer hoppers, and their discharging holes or chambers, the whole being substantially as above set forth.

In testimony whereof I have hereunto set my signature this 17th day of December, A. D. 1856.

GALUSHA J. BUNDY.

Witnesses:
MARTHA H. GOSS,
PHILIP GOSS.